(12) United States Patent
Koshiba et al.

(10) Patent No.: US 7,615,310 B2
(45) Date of Patent: Nov. 10, 2009

(54) ORGANIC ELECTROLYTE BATTERY INCLUDING AT LEAST ONE OF PHTHALAZONE AND A PHTHALAZONE DERIVATIVE

(75) Inventors: Nobuharu Koshiba, Ikoma-gun (JP); Youko Sano, Neyagawa (JP); Shinichi Kawaguchi, Kishiwada (JP)

(73) Assignee: Panasonic Corporation, Osaka (JP)

( * ) Notice: Subject to any disclaimer, the term of this patent is extended or adjusted under 35 U.S.C. 154(b) by 666 days.

(21) Appl. No.: 11/271,851

(22) Filed: Nov. 14, 2005

(65) Prior Publication Data
US 2006/0222959 A1 Oct. 5, 2006

(30) Foreign Application Priority Data
Nov. 18, 2004 (JP) ............................. 2004-334126

(51) Int. Cl.
*H01M 6/04* (2006.01)
*H01M 4/60* (2006.01)
(52) U.S. Cl. .................. 429/188; 429/212; 429/347
(58) Field of Classification Search .................. 429/188, 429/212
See application file for complete search history.

(56) References Cited

FOREIGN PATENT DOCUMENTS

| JP | 07-022069 | | 1/1995 |
| JP | 2002134166 | A * | 5/2002 |
| JP | 2002270181 | A * | 9/2002 |

OTHER PUBLICATIONS

Vaughan, Wyman R. "The Chemistry of Phthalazines." Chem. Rev., 43(3) (1948): 447-508.*

* cited by examiner

*Primary Examiner*—Dah-Wei D Yuan
*Assistant Examiner*—Zachary Best
(74) *Attorney, Agent, or Firm*—McDermott Will & Emery LLP

(57) ABSTRACT

An organic electrolyte battery of this invention includes: a positive electrode comprising a positive electrode active material; a negative electrode comprising a negative electrode active material; an organic electrolyte comprising at least an organic solvent and a solute dissolved in the organic solvent; and an additive that suppresses an increase in internal resistance. The additive includes at least one of phthalazone and a phthalazone derivative. The addition of the additive to the battery suppresses an increase in internal resistance upon storage and upon charge/discharge cycling, thereby making it possible to improve the storage characteristics and charge/discharge cycle characteristic of the battery.

8 Claims, 1 Drawing Sheet

ORGANIC ELECTROLYTE BATTERY INCLUDING AT LEAST ONE OF PHTHALAZONE AND A PHTHALAZONE DERIVATIVE

FIELD OF THE INVENTION

The present invention relates to an organic electrolyte battery, and particularly, to an organic electrolyte battery with improved storage characteristics.

BACKGROUND OF THE INVENTION

With the recent reduction in size and weight of electronic devices, there is an increasing demand for batteries with high energy densities. This has lead to active research and development of lithium primary batteries that use lithium metal as a negative electrode active material and lithium ion secondary batteries that use carbon material as a negative electrode active material.

Such lithium batteries that use lithium metal or carbon material as negative electrode active materials use, for example, an organic electrolyte including an organic solvent and a solute dissolved therein. Typical organic solvents used for forming organic electrolytes include propylene carbonate, ethylene carbonate, butylene carbonate, dimethyl carbonate, diethyl carbonate, sulfolane, dimethoxyethane, tetrahydrofuran, dioxolane, and γ-butyrolactone. They are used singly or in combination with two or more of them. Also, exemplary solutes include $LiClO_4$, $LiPF_6$, $LiBF_4$, $LiCF_3SO_3$, $LiN(CF_3SO_2)_2$, $LiN(C_2F_5SO_2)_2$, and $LiN(CF_3SO_2)(C_4F_9SO_2)$.

Recently, extensive studies have also been conducted on lithium polymer batteries using a gel electrolyte composed of a combination of an organic electrolyte and a polymer and all-solid lithium polymer batteries using a polymer solid electrolyte.

Exemplary polymers used for forming gel electrolytes are polyvinylidene fluoride (PVDF), polyethylene oxide (PEO), polyacrylonitrile (PAN), poly(methyl methacrylate) (PMMA), and polymer-based derivatives such as polysiloxane.

For gel electrolytes and solid polymer electrolytes, essentially the same solutes as those used in organic electrolytes are used.

It is known that substances forming organic electrolytes chemically react with moisture inside a battery, a positive electrode or a negative electrode. Particularly, organic electrolytes are highly reactive with respect to lithium metal, lithium alloy (e.g., Li—Al, Li—Sn), and lithium-containing carbon material, which are negative electrode active materials. Due to the chemical reaction between a negative electrode and an organic electrolyte, for example, a film made of decomposition products of the organic solvent is formed on the surface of the negative electrode, thereby resulting in an increase in internal resistance of the battery. Therefore, if the battery is stored for an extended period of time, the increase in internal resistance of the battery causes a large voltage drop upon discharge, which may lead to insufficient discharge characteristics.

In secondary batteries, repetitive charge/discharge cycling also increases the internal resistance of the battery, resulting in degradation in cycle characteristics.

As such, for example, Japanese Laid-Open Patent Publication No. Hei 7-22069 proposes adding an additive that forms a stable film on the negative electrode surface to an organic electrolyte, in order to suppress the increase in internal resistance of an organic electrolyte battery. As such an additive, for example, an aromatic dicarboxylic acid ester is used.

However, if such an additive is added to an organic electrolyte, the film formed on the negative electrode surface has a relatively large resistance. Hence, it is difficult to obtain sufficient discharge characteristics.

It is therefore an object of the present invention to provide an organic electrolyte battery in which the increase in internal resistance is suppressed upon storage. It is another object of the present invention to provide an organic electrolyte battery with improved charge/discharge cycle characteristics.

BRIEF SUMMARY OF THE INVENTION

An organic electrolyte battery in accordance with the present invention includes: a positive electrode comprising a positive electrode active material; a negative electrode comprising a negative electrode active material; an organic electrolyte comprising at least an organic solvent and a solute dissolved in the organic solvent; and an additive that suppresses an increase in internal resistance. The additive includes at least one of phthalazone and a phthalazone derivative.

In a preferable embodiment of the present invention, the phthalazone derivative has an alkali metal substituted for a hydrogen atom of the imide group of the phthalazone.

In another preferable embodiment of the present invention, the additive is included in the organic electrolyte. Also, the amount of the additive included in the organic electrolyte is more preferably 0.001 to 10 parts by weight per 100 parts by weight of the solute.

In another preferable embodiment of the present invention, the additive is included in the positive electrode. Also, the amount of the additive included in the positive electrode is more preferably 0.001 to 10 parts by weight per 100 parts by weight of the positive electrode active material.

In another preferable embodiment of the present invention, the positive electrode active material contains a manganese compound. Also, the manganese compound is more preferably rechargeable.

In another preferable embodiment of the present invention, the negative electrode active material includes a material capable of absorbing and releasing lithium, lithium metal or a lithium alloy.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
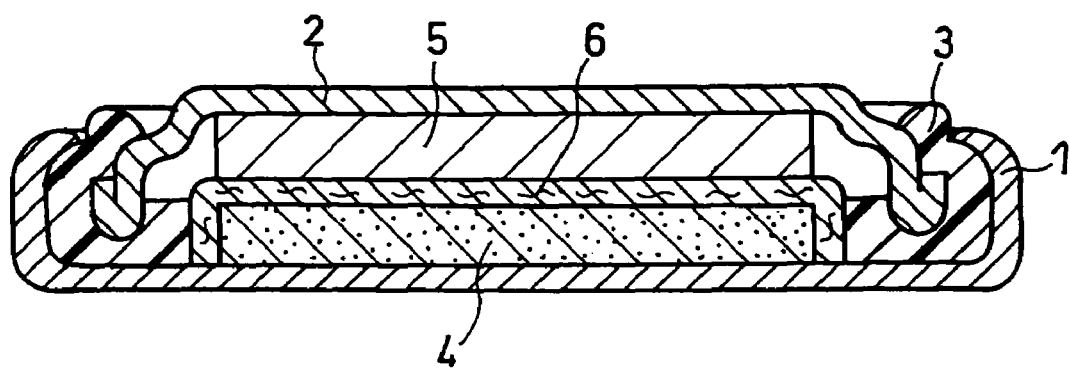
FIG. 1 is a longitudinal sectional view of a flat organic electrolyte battery produced in Examples.

The organic electrolyte battery in accordance with the present invention includes: a positive electrode comprising a positive electrode active material; a negative electrode comprising a negative electrode active material; an organic electrolyte comprising at least an organic solvent and a solute dissolved in the organic solvent; and an additive that suppresses an increase in internal resistance. The additive that suppresses an increase in internal resistance includes at least one of phthalazone and a phthalazone derivative. The present invention is applicable to both primary batteries and secondary batteries.

Exemplary positive electrode active materials contained in the positive electrode of primary batteries include, fluorides, such as $CF_x$, and manganese dioxide ($MnO_2$). Exemplary positive electrode active materials contained in the positive electrode of secondary batteries include metal oxides, such as $LiCoO_2$, $LiNiO_2$, $LiMn_2O_4$, $LiMnO_2$, $V_2O_5$, $V_6O_{13}$, $WO_3$, $Nb_2O_5$, and $Li_{4/3}Ti_{5/3}O_4$, composite oxides, such as $LiCo_{1-x}Ni_xO_2$ and $LiMn_{2-x}A_xO_4$ (A is an element other than manganese), sulfides, such as $FeS_2$ and $TiS_2$, and polymers, such as polypyrrole and polyaniline. These positive electrode active materials can also be used in primary batteries.

These positive electrode active materials may be used singly or in combination with two or more of them.

In both primary batteries and secondary batteries, the positive electrode may include a known conductive agent and a known binder, in addition to the positive electrode active material.

Exemplary negative electrode active materials contained in the negative electrode include lithium metal, lithium alloys, such as Li—Al, Li—Si, Li—Sn, Li-MSi (M is a metal such as Ti or Ni), Li-MSn (M is a metal such as Fe, Cu or Ti), and Li—Pb, carbon materials, such as graphite and coke, metal oxides, such as SiO, SnO, $Fe_2O_3$, $WO_2$, $Nb_2O_5$, and $Li_{4/3}Ti_{5/3}O_4$, and nitrides, such as $Li_{0.4}CoN$. These negative electrode active materials can be used in both primary batteries and secondary batteries.

The negative electrode may include a known conductive agent and a known binder with the negative electrode active material.

The organic electrolyte comprises at least an organic solvent and a solute dissolved in the organic solvent. The organic solvent is not particularly limited, and any known organic solvent used in organic electrolytes can be used. Exemplary organic solvents include, propylene carbonate, ethylene carbonate, butylene carbonate, vinylene carbonate, dimethyl carbonate, diethyl carbonate, sulfolane, dimethoxyethane, diethoxyethane, tetrahydrofuran, dioxolane, and γ-butyrolactone. Also, these organic solvents may be used singly or in combination with two or more of them.

The solute is not particularly limited, and any known solute used in organic electrolytes can be used. Exemplary solutes include $LiPF_6$, $LiBF_4$, $LiClO_4$, $LiCF_3SO_3$, $LiN(CF_3SO_2)_2$, $LiN(C_2F_5SO_2)_2$, and $LiN(CF_3SO_2)(C_4F_9SO_2)$. Also, these solutes may be used singly or in combination with two or more of them.

The above-mentioned organic electrolytes can be used in both primary batteries and secondary batteries.

The separator material may be a material that is stable inside the battery. Exemplary materials include non-woven fabric made of polypropylene, non-woven fabric made of polyphenylene sulfide, and microporous films made of polyolefin resin (polyethylene, polypropylene and the like). Such separators can be used in both primary batteries and secondary batteries.

Instead of the separator, a gel electrolyte including an organic electrolyte composed of an organic solvent and a solute may be used. Further, a highly flexible polymer electrolyte including an organic electrolyte composed of an organic solvent and a solute may be used instead of the separator.

According to the present invention, an additive that suppresses an increase in internal resistance is added to the battery, particularly the organic electrolyte or the portion of the battery that comes into contact with the organic electrolyte (e.g., the positive electrode or negative electrode). The additive includes at least one of phthalazone and a derivative thereof. Phthalazone is represented by the following structural formula:

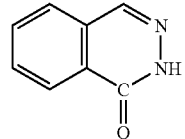

As shown by the structural formula, phthalazone is composed of a benzene ring and a six-membered ring including one carbon-carbon bond of the benzene ring, an imide group and a carbonyl group.

The imide group tends to be adsorbed on the above-mentioned negative electrode active materials. Also, since the benzene ring is hydrophobic, it tends to be adsorbed on the surface of a hydrophobic solid, for example, the surface of the negative electrode active material. Therefore, due to the imide group and the benzene ring, it is considered that phthalazone closely adheres to the negative electrode more firmly, thereby forming an effective protective film on the negative electrode surface.

Also, the carbonyl group of phthalazone has an affinity for the organic electrolyte. Hence, it is thought that the formation of the phthalazone film on the negative electrode improves the affinity between the negative electrode and the organic electrolyte and hence the ionic conductivity.

Further, the addition of the above-mentioned additive to the battery can produce the effect of preventing metal ions (e.g., manganese ion) contained in the positive electrode active material from leaching out of the positive electrode active material. Although the reason is not clear at this moment, it is probably because a special protective film is also formed on the positive electrode surface by the close adhesion of the benzene ring and the six-membered ring having the imide group to the positive electrode surface, in the same manner as the negative electrode surface. This protective film is considered to suppress the leaching of metal ions from the positive electrode active material.

Further, the additive may include a phthalazone derivative. The phthalazone derivative is represented by, for example, the following structural formula:

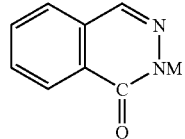

In the structural formula, M is an alkali metal.

In the phthalazone derivative represented by the above structural formula, the hydrogen atom of the imide group is replaced with an alkali metal, for example, Li, Na, or K. The use of such a phthalazone derivative can also produce the effect of suppressing the increase in internal resistance of the battery, in the same manner as the above. This is probably because the anion of the phthalazone derivative is specifically adsorbed on the negative electrode, thereby forming a stable film, in the same manner as the above.

When the additive is added to the organic electrolyte, the amount of additive is preferably 0.001 to 10 parts by weight per 100 parts by weight of the solute. Also, when the additive is added to the positive electrode, the amount of additive is preferably 0.001 to 10 parts by weight per 100 parts by weight of the positive electrode active material. If the amount of additive is less than 0.001 part by weight, the additive may produce no effect. If the amount of additive is greater than 10 parts by weight, the resultant film becomes excessive, so that it may not produce a prominent effect proportional to the amount of additive. The amount of additive is more preferably 0.01 to 1 part by weight per 100 parts by weight of the solute or positive electrode active material.

It is particularly preferable to use a manganese oxide, such as $LiMn_2O_4$, $LiMnO_2$, or $MnO_2$ as the positive electrode active material. In this case, the additive produces a prominent effect. The reason is that in the case of using a manganese oxide having a high manganese-ion leaching rate, the addition of the above-mentioned additive to the battery suppresses the leaching of the manganese ion from the manganese oxide, so that the increase in internal resistance is significantly suppressed.

Also, among the above-mentioned negative electrode active materials, it is preferable to use lithium metal, a lithium alloy, or a material capable of absorbing and releasing lithium such as carbon material. These negative electrode active materials are highly reactive with respect to organic electrolytes, the use of these negative electrode active materials in combination with the above-mentioned additives makes it possible to sufficiently suppress the increase in internal resistance of the battery upon storage. The positive electrode active material to be combined with such a negative electrode active material is selected as appropriate, depending on whether it is used to produce a primary battery or a secondary battery.

The additive may be incorporated into any interior part of the battery as long as it comes into contact with the organic electrolyte. It is particularly preferable to add the additive to at least one of the organic electrolyte and the positive electrode. When the additive is added to the organic electrolyte, the positive and negative electrodes are impregnated with the organic electrolyte, so that a uniform film of the additive can be formed on each of the positive electrode surface and the negative electrode surface. When the additive is added to the positive electrode, even the use of a compound such as a manganese oxide, which tends to release a metal ion, as the positive electrode active material makes it possible to remarkably suppress the leaching of metal ions from the active material.

When the additive is added to the positive electrode and/or negative electrode, it is preferred that the additive be evenly dispersed inside the electrode. This makes it possible to prevent the positive electrode and/or negative electrode from undesirably including an active material with a protective film formed on the surface and an active material without a protective film formed on the surface. For example, when the electrode is composed of a current collector and an electrode mixture layer formed thereon, the additive can be evenly dispersed in the electrode mixture layer by evenly dispersing the additive into a paste for forming the electrode mixture layer.

If a metal such as lithium metal is used as the negative electrode active material, a step of dispersing the additive to the metal becomes necessary, which may make the battery production process complicated. Hence, if lithium metal is used as the negative electrode active material, it is preferred to add the additive to the organic electrolyte and/or positive electrode.

The organic electrolyte battery of the present invention may be a secondary battery. In other words, the positive electrode active material and the negative electrode active material may be rechargeable. For example, when a secondary battery is subjected to repetitive charge/discharge cycling, metal ions may leach out of the positive electrode active material as the charge/discharge cycle proceeds. However, the addition of the additive to the battery suppresses the leaching of metal ions even upon repetitive charge/discharge cycling. As a result, even upon repetitive charge/discharge cycling, the increase in internal resistance is suppressed. This effect becomes remarkable particularly when a rechargeable manganese compound such as a manganese oxide is used as the positive electrode active material. In this case, any negative electrode active material that is conventionally used in lithium secondary batteries may be used.

As described above, the addition of phthalazone or a derivative thereof to the battery causes a protective film to be formed on the negative electrode surface, thereby making it possible to prevent the reaction between the negative electrode and the organic electrolyte and therefore the formation of a film made of decomposition products of the organic solvent. Also, the addition of phthalazone or a derivative thereof to the battery can prevent the leaching of metal ions from the positive electrode active material, thereby making it possible to suppress the increase in internal resistance of the positive electrode. It is therefore possible to suppress the increase in internal resistance of the battery. Further, in the case of secondary batteries, this can prevent the formation of a film made of decomposition products of the organic solvent upon repetitive charge/discharge, thereby suppressing unnecessary consumption of the organic electrolyte. Accordingly, the present invention can provide an organic electrolyte battery that is excellent in storage characteristics and charge/discharge cycle characteristics.

The present invention is hereinafter described specifically by way of Examples. These Examples, however, are not to be construed as limiting in any way the present invention.

EXAMPLE 1

This example used organic electrolytes containing additives A to D represented by structural formulas as shown in Table 1. The additive A is phthalazone, the additive B a phthalazone derivative in which the hydrogen atom of the imide group is replaced with K, the additive C a phthalazone derivative in which the hydrogen atom of the imide group is replaced with Li, and the additive D a phthalazone derivative in which the hydrogen atom of the imide group is replaced with Na.

TABLE 1

| Additive A | phthalazin-1(2H)-one (N-NH, C=O) |
| Additive B | phthalazinone with N-NK |
| Additive C | phthalazinone with N-NLi |
| Additive D | phthalazinone with N-NNa |

(Battery A1)

In this example, a flat type organic electrolyte battery 10 as illustrated in FIG. 1 was produced.

A battery 10 includes a positive electrode disc 4, a negative electrode disk 5, and a separator 6 made of polypropylene non-woven fabric interposed between the positive electrode 4 and the negative electrode 5. The positive electrode 4 is mounted on the inner bottom face of a stainless steel positive electrode can 1. The negative electrode 5 is bonded under pressure to the inner face of a stainless steel negative electrode can 2, or is mounted thereon. The circumference of the negative electrode can 2 is fitted with a polypropylene insulating gasket 3. The opening edge of the positive electrode can 1 is crimped onto the insulating gasket 3, thereby sealing the space containing the positive electrode 4, the negative electrode 5, the separator 6 and an organic electrolyte (not shown). The positive electrode 4 and the negative electrode 5 are arranged so as to face each other, with the separator 6 therebetween.

(Preparation of Positive Electrode)

Lithium cobaltate ($LiCoO_2$) powder was used as the positive electrode active material. The positive electrode active material, carbon powder serving as a conductive agent, and fluorocarbon resin serving as a binder were mixed together in a weight ratio of 80:10:10. The resultant mixture was molded into a cylindrical pellet and dried at 200° C., to obtain the positive electrode 4. The diameter of the positive electrode was 16 mm, and the area of the surface of the positive electrode facing the negative electrode was 2.0 $cm^2$.

(Preparation of Negative Electrode)

Graphite powder was used as the negative electrode active material. The negative electrode active material and fluorocarbon resin serving as a binder were mixed together in a weight ratio of 85:15. The resultant mixture was molded into a cylindrical pellet and dried at 200° C., to obtain the negative electrode 5. The diameter of the negative electrode was 16 mm, and the area of the surface of the negative electrode facing the positive electrode was 2.0 $cm^2$.

(Preparation of Organic Electrolyte)

An organic electrolyte was prepared by dissolving $LiPF_6$ serving as a solute at a concentration of 1.0 mol/L in a mixture solvent of ethylene carbonate and diethyl carbonate in a volume ratio of 50:50. 0.1 part by weight of the additive A was added to this organic electrolyte per 100 parts by weight of the solute.

(Assembly of Battery)

The negative electrode 5 was mounted on the inner bottom face of the negative electrode can 2 fitted with the insulating gasket 3, and the separator 6 (thickness 100 μm) made of polypropylene non-woven fabric that had been punched out into a round shape was mounted thereon. Thereafter, the organic electrolyte containing the additive A was injected into the negative electrode can 2, to impregnate the negative electrode 5 and the separator 6 with the organic electrolyte.

Next, the positive electrode 4 was mounted on the separator 6 such that the negative electrode 5 and the positive electrode 4 faced each other, and the positive electrode can 1 was mounted on the positive electrode 4. Subsequently, the opening edge of the positive electrode can 1 was crimped onto the insulating gasket 3 fitted to the negative electrode can 2, to complete the flat type battery 10. The resultant battery was designated as a battery A1. This battery was a secondary battery, with its dimensions being an outer diameter of 20 mm and a height of 2.5 mm. The diameter of each of the positive and negative electrodes was 16 mm, the areas of the opposing surfaces of the positive and negative electrodes were 2.0 $cm^2$.

(Batteries B1 to D1)

Organic electrolyte batteries were produced in the same manner as the production method of the battery A1, except that the additive B, C or D was added to the organic electrolyte. The resultant batteries were designated as batteries B1 to D1.

(Comparative Battery 1)

A comparative battery 1 was produced in the same manner as the production method of the battery A1, except that an additive was not added to the organic electrolyte.

(Evaluation)

Using the batteries A1 to D1 and comparative battery 1, their internal resistances were measured immediately after the production of the batteries. Subsequently, these batteries were charged at a constant current of 1 $mA/cm^2$ until their battery voltages reached 4.2 V. The charged batteries were stored in a constant temperature container at 60° C. for 20 days. After the storage, the internal resistances of the respective batteries were measured again. It should be noted that the internal resistances of the batteries were measured by an alternating current method at 1 kHz. This also applies to the following Examples. Table 2 shows the results.

Further, these batteries were subjected to the following charge/discharge test.

The batteries were charged at a constant current of 1 $mA/cm^2$ until their battery voltage reached 4.2 V, and then discharged until their battery voltage dropped to 3.0 V. After this charge/discharge cycle was repeated 100 times, the internal resistances of the batteries were measured. Table 2 shows the results.

TABLE 2

| | Additive | Internal resistance | | |
| --- | --- | --- | --- | --- |
| | | Before storage (Ω) | After storage (Ω) | After charge/discharge cycles(Ω) |
| Battery A1 | A | 10.7 | 11.8 | 11.8 |
| Battery B1 | B | 10.9 | 12.0 | 12.1 |
| Battery C1 | C | 10.8 | 12.1 | 12.2 |
| Battery D1 | D | 11.0 | 12.3 | 12.5 |
| Comparative battery 1 | None | 10.6 | 19.8 | 21.0 |

Table 2 shows that the batteries A1 to D1 into which the additive was incorporated have lower internal resistances after storage than the comparative battery 1 including no additive. Also, even when the charge/discharge was repeated, the batteries A1 to D1 have lower internal resistances. That is, it has been found that the addition of the additive suppresses an increase in battery internal resistance, thereby providing good cycle characteristics.

In this example, the additive A produced the best results.

EXAMPLE 2

Organic electrolyte batteries were produced in the same manner as in Example 1, except for the use of the following positive electrode, negative electrode and organic electrolytes. The batteries produced in this example are primary batteries.

(Preparation of Positive Electrode)

Manganese dioxide heat-treated at 400° C. was used as the positive electrode active material. This manganese dioxide, carbon powder serving as a conductive agent, and fluorocarbon resin serving as a binder were mixed together in a weight ratio of 80:10:10. The resultant mixture was formed into a pellet and dried at 250° C., to obtain the positive electrode 4.

(Preparation of Negative Electrode)

Lithium metal was used as the negative electrode active material. A rolled plate of lithium metal was punched out into predetermined dimensions, to obtain the negative electrode 5.

(Preparation of Organic Electrolytes A2 to D2)

An organic electrolyte was prepared by dissolving $LiCF_3SO_3$ serving as a solute at 1.0 mol/L in a solvent mixture of propylene carbonate and dimethoxyethane in a volume ratio of 50:50. In the same manner as in Example 1, 0.1 part by weight of the additive A, B, C, or D was added to the organic electrolyte per 100 parts by weight of the solute. The resultant organic electrolytes were designated as organic electrolytes A2 to D2.

Batteries A2 to D2 were produced in the same manner as the production method of the battery A1, except for the use of the above-described positive electrode, negative electrode and organic electrolytes A2 to D2.

Also, for comparison, a comparative battery 2 was produced in the same manner as the production method of the battery A2, except for the use of an organic electrolyte containing no additive. The batteries A2 to D2 and comparative battery 2 are primary batteries.

(Evaluation)

Using the batteries A2 to D2 and comparative battery 2, their internal resistances were measured immediately after the production of the batteries in the same manner as in Example 1.

Subsequently, the measured batteries were stored in a constant temperature container at 60° C. for 2 months. After the storage, the internal resistances of the respective batteries were measured again. Table 3 shows the results.

TABLE 3

| | Additive | Internal resistance | |
| --- | --- | --- | --- |
| | | Before storage(Ω) | After storage(Ω) |
| Battery A2 | A | 10.2 | 11.5 |
| Battery B2 | B | 10.3 | 11.2 |
| Battery C2 | C | 10.6 | 10.8 |
| Battery D2 | D | 10.6 | 11.8 |
| Comparative battery 2 | None | 10.0 | 23.5 |

Table 3 shows that the batteries A2 to D2 have lower internal resistances after storage than the comparative battery 2 including no additive. In this example, the battery C2 including the additive C exhibited the best result.

EXAMPLE 3

Batteries A3 to A9 were produced in the same manner as the production method of the battery A2, except that the amount of additive A added to the organic electrolyte was varied in the range of 0.0005 to 15 parts by weight per 100 parts by weight of the solute, as shown in Table 4. The batteries produced in this example are primary batteries in the same manner as in Example 2.

Immediately after the production of the batteries A3 to A9, their internal resistances were measured.

Subsequently, the batteries after the measurement were stored in a constant temperature container at 60° C. for 2 months. After the storage, the internal resistances of the batteries were measured again. Table 4 shows the results. Table 4 also shows the result of the comparative battery 2.

TABLE 4

| | Amount of additive (*) | Internal resistance | |
| --- | --- | --- | --- |
| | | Before storage (Ω) | After storage (Ω) |
| Comparative battery 2 | 0 | 10.0 | 23.5 |
| Battery A3 | 0.0005 | 10.0 | 22.5 |
| Battery A4 | 0.001 | 10.0 | 16.0 |
| Battery A5 | 0.01 | 10.0 | 12.8 |
| Battery A6 | 0.1 | 10.1 | 11.5 |
| Battery A7 | 1 | 10.2 | 12.0 |
| Battery A8 | 10 | 11.5 | 16.8 |
| Battery A9 | 15 | 14.0 | 19.4 |

(*) Part(s) by weight per 100 parts by weight of solute

Table 4 shows that the addition of the additive to the organic electrolyte results in suppression of an increase in internal resistances of the respective batteries upon storage, in comparison with the comparative battery 2. Also, when the amount of additive is 0.001 to 10 parts by weight per 100 parts by weight of the solute, the effect is remarkable.

Table 4 also indicates that the particularly preferable amount of additive is 0.01 to 1 part by weight per 100 parts by weight of the solute.

When other additives (e.g., additives B to D) were used, essentially the same tendency as that of the additive A was found with respect to the amount of additives and the effect of suppressing the increase in internal resistance.

In the foregoing Examples 1 to 3, the additive was added to the organic electrolyte, but the incorporation of the additive into the positive electrode also produced almost the same results as the incorporation of the additive into the organic electrolyte.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An organic electrolyte battery comprising: a positive electrode comprising a positive electrode active material; a negative electrode comprising a negative electrode active material; an organic electrolyte comprising at least an organic solvent and a solute dissolved in said organic solvent; and an additive that suppresses an increase in internal resistance, wherein said additive comprises at least one of phthalazone and a phthalazone derivative, and said phthalazone derivative has an alkali metal substituted for a hydrogen atom bonded to a nitrogen atom of the amide group in phthalazone.

2. The organic electrolyte battery in accordance with claim 1, wherein said additive is included in said organic electrolyte.

3. The organic electrolyte battery in accordance with claim 2, wherein the amount of said additive included in said organic electrolyte is 0.001 to 10 parts by weight per 100 parts by weight of said solute.

4. The organic electrolyte battery in accordance with claim 1, wherein said additive is included in said positive electrode.

5. The organic electrolyte battery in accordance with claim 4, wherein the amount of said additive included in said positive electrode is 0.001 to 10 parts by weight per 100 parts by weight of said positive electrode active material.

6. The organic electrolyte battery in accordance with claim 1, wherein said positive electrode active material comprises a manganese compound.

7. The organic electrolyte battery in accordance with claim 6, wherein said manganese compound is rechargeable.

8. The organic electrolyte battery in accordance with claim 1, wherein said negative electrode active material comprises a material capable of absorbing and releasing lithium, lithium metal or a lithium alloy.

* * * * *